United States Patent
Preishuber-Pfluegl et al.

(10) Patent No.: US 6,816,062 B2
(45) Date of Patent: Nov. 9, 2004

(54) DATA CARRIER FOR TRANSMITTING DIFFERENT STORED STATUS INFORMATION WITH DIFFERENT TRANSMISSION PARAMETERS

(75) Inventors: Josef Preishuber-Pfluegl, Graz (AT); Franz Amtmann, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 19 days.

(21) Appl. No.: 10/305,322

(22) Filed: Nov. 26, 2002

(65) Prior Publication Data

US 2003/0146837 A1 Aug. 7, 2003

(30) Foreign Application Priority Data

Nov. 29, 2001 (EP) .............................. 01000677

(51) Int. Cl.[7] .................................. H04Q 5/22
(52) U.S. Cl. .................................. 340/10.1; 340/10.4
(58) Field of Search .................. 340/572.1, 572.3, 340/572.4, 505, 10.1, 10.3, 10.4

(56) References Cited

U.S. PATENT DOCUMENTS

| | | | | | |
|---|---|---|---|---|---|
| 5,025,253 A | * | 6/1991 | DiLullo et al. | .......... | 340/10.41 |
| 5,053,774 A | * | 10/1991 | Schuermann et al. | .... | 340/10.34 |
| 5,216,419 A | * | 6/1993 | Fujisaka et al. | .......... | 340/10.52 |
| 5,804,810 A | | 9/1998 | Woolley et al. | .............. | 235/492 |
| 5,847,662 A | * | 12/1998 | Yokota et al. | ........... | 340/10.34 |
| 5,850,187 A | * | 12/1998 | Carrender et al. | ......... | 340/10.6 |
| 6,288,629 B1 | * | 9/2001 | Cofino et al. | ............... | 340/10.1 |
| 6,617,963 B1 | * | 9/2003 | Watters et al. | ........... | 340/10.41 |
| 6,630,885 B2 | * | 10/2003 | Hardman et al. | ........... | 340/505 |

* cited by examiner

Primary Examiner—Thomas J Mullen, Jr.
(74) Attorney, Agent, or Firm—Kevin Simons

(57) ABSTRACT

A data carrier (1) for contactless communication with the communication station comprises firstly a receiving stage (3) for receiving a request signal (IS), secondly a storage facility (16) for storing at least two items of status information (EASB1, EASB2), thirdly a readout facility (15) for reading out one item of status information (EASB1, EASB2) at a time in response to receiving the request signal (IS), fourthly a processing circuit (18) for processing the status information (EASB1, EASB2) read out in each case so as to create a transmission signal (MCRS) suitable for transmission to the communication station, fifthly a recognition facility (22) for recognizing the status information (EASB1, EASB2) read out in each case, and sixthly a control connection (25) between the recognition facility (22) and the processing circuit (18), such that the processing circuit (18) can be influenced via the control connection (25) into altering a transmission parameter for a transmission signal generated by the processing circuit (18) as a function of the status information (EASB1, EASB2) recognized and readout in each case.

14 Claims, 4 Drawing Sheets

DATA CARRIER FOR TRANSMITTING DIFFERENT STORED STATUS INFORMATION WITH DIFFERENT TRANSMISSION PARAMETERS

BACKGROUND OF INVENTION

1. Field of the Invention

The invention relates to a data carrier, which data carrier is provided and designed for contactless communication with a communication station and for this purpose comprises receiving means for receiving a request signal, which request signal can be generated by a communication station and can be transmitted to the data carrier in a contactless manner with the aid of a field generated by the communication station and acting on the data carrier, wherein the data carrier comprises storage means for storing at least two items of status information of significance for the data carrier, and readout means for reading out, in each case, one stored item of status information in response to receiving the request signal, and processing means for processing the status information read out in each case, which processing means process the status information read out in each case to create a transmission signal suitable for transmission to the communication station, and in which processing means at least one transmission parameter for the transmission signal can be altered.

The invention further relates to a circuit for a data carrier for contactless communication with the communication station, which circuit comprises connection means for receiving a request signal and storage means for storing at least two items of status information of significance for the data carrier, and readout means for reading out, in each case, one stored item of status information as a result of receiving the request signal, and processing means for processing the status information read out in each case.

The invention further relates to a communication station for contactless communication with a data carrier having the design described above in the first paragraph.

2. Description of Related Art

A data carrier with the design described above in the first paragraph with a circuit having the design described above in the second paragraph has been marketed by the applicant and is therefore known. Among the applications of the known data carrier, there is one in which the known data carrier or a plurality of known data carriers of this kind are part of a so-called electronic article surveillance system (EAS system). In an electronic article surveillance system of this kind, a data carrier is in each case attached to an article to be subjected to surveillance, for example to an item of clothing or a device in the field of entertainment electronics, or one of many other products. A so-called EAS bit configuration may here remain in its original status or be set for a new status, which results in either a first EAS bit configuration or a second EAS bit configuration being stored in storage means of the known data carrier, whereby the first EAS bit configuration forms a first item of status information of significance for the data carrier and the article to which the data carrier is attached, and the second EAS bit configuration forms a second item of status information of significance for the data carrier and the article to which the data carrier is attached. In a known embodiment, the first EAS bit configuration, which forms the first item of status information, is formed by the bit "1", and the second EAS bit configuration, which forms the second item of status information, is formed by the bit "0". Many other bit configurations with a higher number of bits are, of course, also possible. The first EAS bit configuration, i.e. the bit "1", is set, in the known system, when the decision is made that the data carrier is to serve for electronic article surveillance, in which case the setting takes place in a contactless manner with the aid of a communication station. The second EAS bit configuration, i.e. the bit "0", is set, in the known system, when the price for the article to which a data carrier is attached has been paid at a cash point, whereby provision is made for the setting of the second EAS bit configuration in a contactless manner at the cash point with the aid of a communication station located there. If, on the other hand, no payment has been made of the price of an article to which a data carrier is attached, the first EAS bit configuration remains stored in the storage means of the data carrier, which causes the first EAS bit configuration originally set to be retained unchanged.

In the known electronic article surveillance system, the design is executed in such a way that, when an article with a data carrier attached to the article passes through a checking station, a communication station contained in the checking station emits an EAS scanning command as a request signal to the data carrier attached to the article, whereby, disadvantageously, only in the event that the first EAS bit configuration, which indicates that the price for the article in question has not been paid, is stored in the data carrier does the data carrier transmit to the communication station a transmission signal, created to take account of the first EAS bit configuration, in the form of a pre-specified, fixed bit pattern, at a fixed time. In the known system, an effect at the communication station side, for example a visual or acoustic warning indication, brought about by an EAS bit configuration stored in a data carrier, i.e. an item of status information, can therefore be derived only from a recognition of the transmission signal created on the basis of the first EAS bit configuration, which means that an effect of this kind can be initiated only upon recognition of an article for which no payment has been made. In the known solution, therefore, only one single item of status information of significance for a data carrier is ever transmitted to a communication station with the aid of a transmission signal with a specific transmission parameter, specifically always at a fixed time, i.e. always in the same time slot. This represents a limitation that has proved a disadvantage in many application cases.

BRIEF SUMMARY OF THE INVENTION

It is an object of the invention to eliminate the above-cited limitation, and to realize an improved data carrier and an improved circuit for a data carrier and an improved communication station.

To achieve the above-cited object, features according to the invention are provided in a data carrier according to the invention, so that a data carrier according to the invention can be characterized as follows.

Data carrier for contactless communication with a communication station, which data carrier comprises the means listed below: receiving means for receiving a request signal, which request signal can be generated by a communication station and can be transmitted to the data carrier in a contactless manner with the aid of a field generated by the communication station and acting on the data carrier, and storage means, which storage means are designed for storing at least two items of status information of significance for the data carrier, and readout means for reading out one stored item of status information at a time as a result of receiving the request signal, and processing means for processing the status information read out in each case, which processing means are designed for processing the status information read out in each case so as to create a transmission signal suitable for transmission to the communication station, and in which processing means at least one transmission parameter for the transmission signal can be altered, and recognition means for recognizing the status information read out in each case, and control connection means between the recognition means and the processing means, which control connection means are designed to have a controlling effect on the processing means as a function of the status information recognized and read out in each case, specifically to alter the at least one transmission parameter for the transmission signal as a function of the status information recognized and read out in each case.

In order to achieve the above object, features according to the invention are provided in a circuit according to the invention, so that a circuit according to the invention can be characterized as follows.

Circuit for a data carrier for contactless communication with a communication station, which circuit is equipped with the means listed below: connection means for receiving a request signal, which request signal can be generated by a communication station and can be transmitted to the data carrier, and consequently to the circuit for the data carrier, in a contactless manner with the aid of a field which is generated by the communication station and acts on the data carrier, and storage means, which storage means are designed for storing at least two items of status information of significance for the data carrier, and readout means for reading out one item of stored status information in each case as a result of receiving the request signal, and processing means for processing the status information read out in each case, which processing means are designed for processing the status information read out in each case so as to create a transmission signal suitable for transmission to the communication station, and in which processing means at least one transmission parameter for the transmission signal can be altered, and recognition means for recognizing the status information read out in each case, and control connection means between the recognition means and the processing means, which control connection means are designed to have a controlling effect on the processing means as a function of the status information recognized and read out in each case, specifically to alter the at least one transmission parameter for the transmission signal as a function of the status information recognized and read out in each case.

The provision of the features according to the invention, achieves in a simple manner and with only a small additional outlay that the creation of the transmission signal suitable for transmission to a communication station is enabled as a function of several items of status information of this kind, and this takes place here as a function of the status information read out in each case, so that, from several items of status information possibly stored in a data carrier, one item of status information can be transmitted in each case to a communication station in an advantageous manner with a transmission parameter selected for the status information concerned. The provision of the measures according to the invention, achieves in an advantageous manner that, in the case of a high number of groups of data carriers, in which groups it is anticipated per se that a specific item of status information will be present among all the data carriers of each group, in the event that, in a group of this kind, a data carrier does not contain the status information anticipated to be in it, this group can be recognized very quickly, following which this group of data carriers can be separated in a simple manner from the remaining groups of data carriers, whereupon finally the data carrier in which a non-anticipated item of status information is stored can be pinpointed among the remaining data carriers of this group, various methods being possible for this pinpointing, although this is not relevant in the present context. It is also achieved in an advantageous manner through the measures according to the invention that information can be obtained in a communication station in a simple manner as to whether at least one data carrier is present in specific possible groups of data carriers, in which the data carriers of each group have a specific item of status information in store. It is further advantageously achieved through the measures according to the invention that the presence of a so-called mixed population of data carriers in a communication field of a communication station can be recognized very simply and rapidly.

In a data carrier according to the invention and in a circuit according to the invention, it has proved particularly advantageous if, in addition, the features as claimed in claim 2 and claim 7, respectively, are provided. A design of this kind is particularly advantageous because the control means, which are capable of generating control data, render possible a high diversity in relation to the control of the processing means as a function of the status information recognized and read out in each case, if so desired. It should, however, be mentioned at this point that, in the simplest case, it is possible to proceed even without provision of the control means, in which case control connection means formed by simple electrical or electronic connections are provided between the recognition means and the processing means, which control connection means can feed control commands emitted by the recognition means directly to the processing means.

In a data carrier according to the invention and in a circuit according to the invention, it has proved advantageous if, in addition, the features as claimed in claim 3 and claim 8, respectively, are provided. A design of this kind has the advantage that the processing of a recognized, read-out item of status information for creating a transmission signal takes place as a function of the recognized, read-out item of status information in a time window starting at a specific occurrence point.

It has also proved advantageous if, in the case of a data carrier according to the invention and a circuit according to the invention, the features as claimed in claim 4 and claim 9, respectively, are additionally provided. It is hereby achieved in a simple manner that the type of coding undertaken in the course of the processing of a recognized, read-out item of status information for creating a transmission signal is chosen as a function of the recognized, read-out item of status information, so that the coding type chosen in each case depends on the recognized, read-out item of status information.

In a data carrier according to the invention and in a circuit according to the invention, it has, however, also proved extremely advantageous if the features as claimed in claim 5 and claim 10, respectively, are additionally provided. A design of this kind provides the advantage that the sub carrier that may be required for processing a recognized, read-out item of status information for creating a transmission signal can be matched to the recognized, read-out item of status information in respect of its sub carrier frequency.

In order to achieve the above-cited object, features according to the invention are provided in a communication station according to the invention, so that a communication station according to the invention can be characterized as follows.

Communication station for contactless communication with a data carrier, which data carrier is designed for contactless communication with the communication station and comprises the means listed below: receiving means for receiving a request signal, which request signal can be generated by the communication station and can be transmitted to the data carrier in a contactless manner with the aid of a field created by the communication station and acting on the data carrier, and storage means, which storage means are designed for storing at least two items of status information of significance for the data carrier, and readout means for reading out, in each case, one stored item of status information as a result of receiving the request signal, and processing means for processing the status information read out in each case, which processing means are designed to process the status information read out in each case so as to create a transmission signal suitable for transmission to the communication station, and in which processing means at least one transmission parameter for the transmission signal can be altered, and recognition means for recognizing the status information read out in each case, and control connection means between the recognition means and the processing means, which control connection means are designed to have a controlling effect on the processing means as a function of the status information recognized and read out in each case, specifically to alter the at least one transmission parameter for the transmission signal as a function of the status information recognized and read out in each case, said communication station comprising the following means: command-signal generating means for generating command signals and receiving means for receiving the transmission signal transmitted to the communication station by the data carrier, and processing means for processing the received transmission signal, and transmission-parameter recognition means for recognition of the transmission parameter of the received transmission signal, and decision means which cooperate with the transmission-parameter recognition means and which are provided and designed to make a decision concerning the generation of at least one command signal as a function of the transmission parameter of the received transmission signal recognized by the transmission-parameter recognition means.

The provision of features according to the invention, achieves in simple manner and with only a small additional outlay in a communication station according to the invention that the generation of specific command signals is permitted or cleared by the decision means only if a specific item of status information is stored in the particular data carrier that is the cause of the command signals being generated, which has been established by the recognition means in the data carrier and which has ultimately influenced the transmission parameter of the transmission signal from the data carrier to the communication station. It is thereby made possible, in a simple and advantageous manner that, for example, in the case of electronic article surveillance system with a communication station according to the invention, a specific display command signal is generated for a display device by a host computer of the article surveillance system only if the status information corresponding to, i.e. matching, this specific display command signal is stored in the article-surveillance data carrier.

In the case of a communication station according to the invention, it has proved especially advantageous if, in addition, the features as claimed in claim 12 are provided.

By this means it is made possible in a simple, advantageous manner, for example, that a specific command signal for a data carrier is generated by the command-signal generating means of the communication station according to the invention only if an item of status information is stored in the data carrier concerned for which the execution of a procedure that can be initiated by the specific command signal is appropriate.

BRIEF DESCRIPTION OF THE DRAWINGS

The invention will be further described with reference to examples of embodiments shown in the drawings, to which, however, the invention is not restricted.

DETAILED DESCRIPTION

Figure 1:
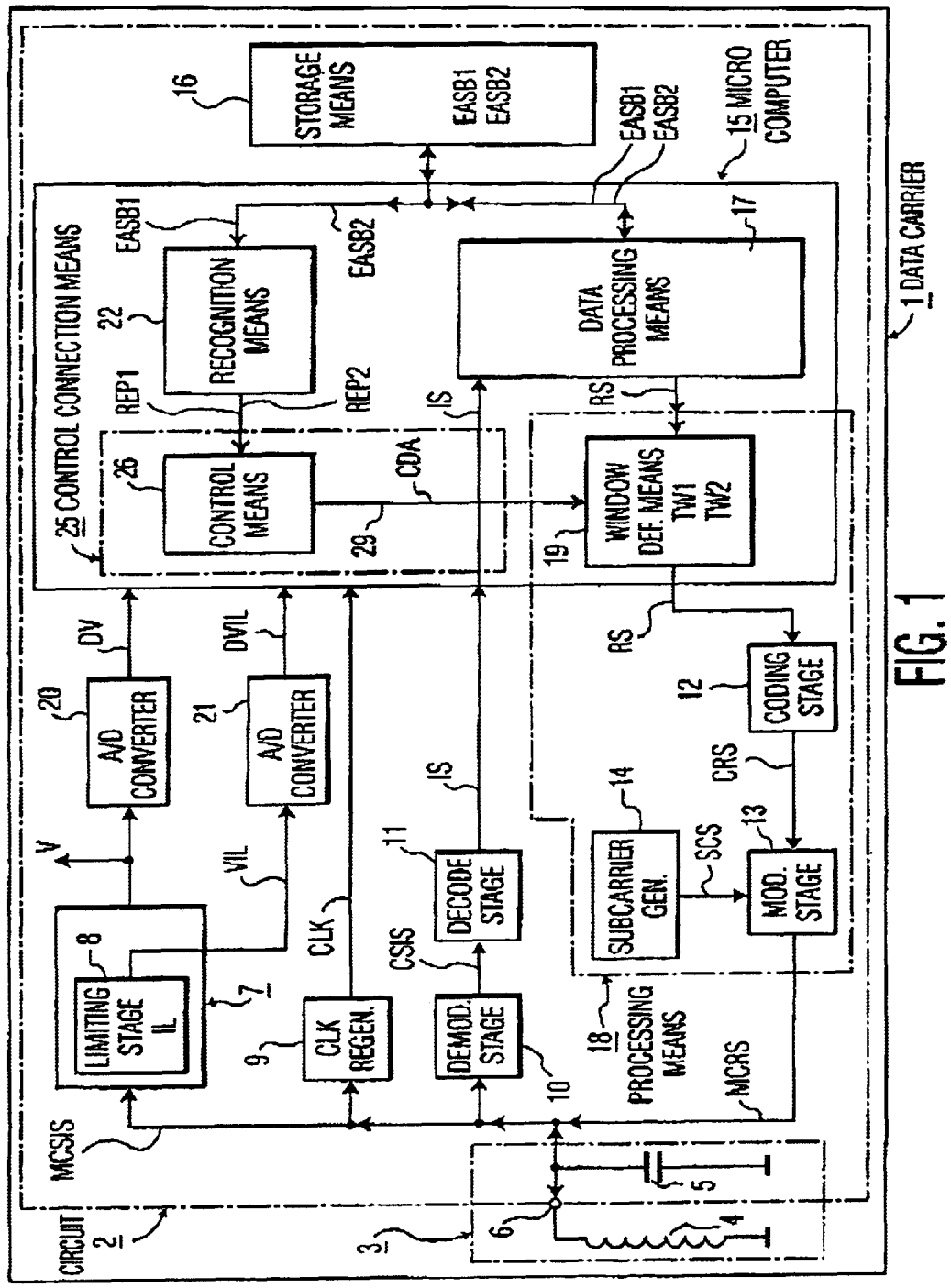
FIG. 1 shows in schematic manner in the form of a block diagram a part of a data carrier and of a circuit for this data carrier that is significant in the present context, according to a first embodiment of the invention.

FIG. 1 shows a data carrier 1 with a circuit 2 for the data carrier 1 according to a first embodiment of the invention. The circuit 2 is an integrated circuit. The data carrier 1 is provided and designed for contactless communication with a communication station 40, shown in FIG. 4. Data carrier 1 is, in the present case, a data carrier 1 which is attached to a product, i.e. to an article such as an item of clothing or a device in the field of entertainment electronics, and in which data concerning the product is stored, for example data concerning the product type, the selling price, the manufacturing date, an expiry date, and similar characteristics. The data carrier 1 and the communication station 40 form components of a so-called electronic article surveillance system. In this article surveillance system, either a first EAS bit configuration EASB1 or a second EAS bit configuration EASB2 is stored in storage means 16 of data carrier 1, wherein the first EAS bit configuration EASB1 forms a first item of status information of significance for the data carrier 1 and the article to which the data carrier 1 is attached, and wherein the second EAS bit configuration EASB2 forms a second item of status information of significance for the data carrier 1 and the article to which the data carrier 1 is attached. In the present case, the first EAS bit configuration EASB1 is formed by the bit "1" and the second EAS bit configuration EASB2 is formed by the bit "0". However, other EAS bit configurations with a higher number of bits are also possible. The first EAS bit configuration EASB1, i.e. bit "1", is stored in storage means 16 when the decision is made that the data carrier 1 is to serve for electronic article surveillance, the setting of the first EAS bit configuration EASB1 taking place in a contactless manner with the aid of the communication station 40. The second EAS bit configuration EASB2, i.e. bit "0", is stored in storage means 16 when the price for the article to which the data carrier 1 is attached has been paid at a cash point, in which case provision is made at the cash point for the storage of the second EAS bit configuration EASB2 in the storage means 16 in a contactless manner by means of a communication station 40 located at said cash point. If a payment of the price for an article to which the data carrier 1 is attached has not taken place, the first EAS bit configuration EASB1 remains stored in the storage means 16 of data carrier 1. Data carrier 1 may, however, also be provided and designed for other applications.

The communication station 40 already mentioned can call up the data stored in data carrier 1, if so required, specifically by contactless communication between data carrier 1 and communication station 40. In order to be able to undertake a contactless communication of this kind in a faultless manner, communication station 40 has to be able to recognize data carrier 1 faultlessly in order to be able to further process, e.g. write information to or read out information from, data carrier 1, and, in many applications, also has to be able to select from a plurality of data carriers of this kind. In order that iris possible to undertake a faultless recognition of a data carrier 1 and a faultless communication with a data carrier 1 with the aid of a communication station 40, data carrier 1 is equipped with a series of means which will be described in greater detail below. It should be mentioned that FIG. 1 shows only those means that are of significance in the present context. Data carrier 1 contains a plurality of further means, further details of which are not, however, described here.

Data carrier 1 is equipped with transmission means 3, which form both reception means and transmission means. The transmission means 3 comprise a transmission coil 4 which is provided outside circuit 2, and a capacitor 5 which is realized within circuit 2. The transmission coil 4 is attached to a connection contact 6 of circuit 2, which connection contact 6 forms a component of connection means of circuit 2. The transmission coil 4 and the capacitor 5 form a tuned circuit the resonance frequency of which corresponds to an operating frequency of at least one signal to be transmitted from the communication station to the data carrier 1. A signal to be transmitted to data carrier 1 is an amplitude-modulated carrier signal MCSIS in the present case. It may, however, also be a different transmission signal.

The transmission means 3, which form reception means, are provided and designed for receiving a request signal IS, which request signal IS is contained in the amplitude-modulated carrier signal MCSIS. The request signal IS can be generated by the communication station, which is not shown, and can be transmitted to data carrier 1 in a contactless manner with the aid of a field generated by the communication station and acting on data carrier 1. In the present case, the transmission takes place in an inductive manner, i.e. in a transformatory manner. The transmission may alternatively be undertaken electromagnetically. The request signal IS calls on data carrier 1, or a plurality of data carriers 1 present in a communication area of communication station 40, to transmit the respective EAS bit configuration EASB1 or EASB2 stored in storage means 16 to communication station 40.

Data carrier 1 and circuit 2 comprise a power-supply circuit 7, which comprises a limiting stage 8, a clock regeneration stage 9, and a demodulation stage 10. The power-supply circuit 7 and the clock regeneration stage 9 and the demodulation stage 10 are each attached to the connection contact 6, which has the result that the modulated carrier signal MCSIS is fed to these circuit components.

The power-supply circuit 7 is provided and designed for generating a DC supply voltage V, utilizing the amplitude-modulated carrier signal MCSIS fed to it, which has been known for a long time. The power-supply circuit 7 comprises a limiting stage 8 capable of limiting the generated DC supply voltage V to a specific limit value. The provision of a limiting stage 8 of this kind in a data carrier 1 of this kind or in power-supply circuit 7 of a data carrier 1 of this kind has also been known for a long time. A limiting current IL occurs in the limiting stage 8, as indicated symbolically in FIG. 1, as a result of its limiting function.

The clock signal regenerating stage 9 is provided and designed for regeneration of a clock signal CLK, utilizing the amplitude-modulated carrier signal MCSIS. This measure has also been known for a long time.

The demodulation stage 10 is provided and designed for the demodulation of the amplitude-modulated carrier signal MCSIS. The amplitude-modulated carrier signal MCSIS can be fed to demodulation stage 10, with the result that demodulation stage 10 can generate and emit a demodulated carrier signal CSIS. Downstream of demodulation stage 10 is a decoding stage 11, to which the demodulated carrier signal CSIS can be fed, and which decodes this still coded signal. This signal has been previously coded in the communication station, which is not shown. Once decoding is complete, decoding stage 11 emits the request signal IS.

The means described hitherto come into operation in the event of a receiving operation of data carrier 1. However, a sending, i.e. transmission operation from data carrier 1 to the communication station can also be undertaken by data carrier 1. For this purpose, data carrier 1, or circuit 2, comprises a coding stage 12 and a modulation stage 13 downstream of coding stage 12, and a subcarrier signal generator 14 which is attached to modulation stage 13. On the output side, modulation stage 13 is attached to connection contact 6 and thereby to transmission means 3, which also form sending means. A response signal RS can be fed to coding stage 12, the generation of which signal will be described in greater detail below. The response signal RS can be coded by coding stage 12, and upon completion of this coding, coding stage 12 emits a coded response signal CRS. The coded response signal CRS can be fed to modulation stage 13. Further, a subcarrier signal SCS generated by the subcarrier signal generator 14 can be fed to modulation stage 13. Utilizing subcarrier signal SCS, modulation stage 13 undertakes amplitude modulation of the coded response signal CRS, so that modulation stage 13 supplies an amplitude-modulated, coded response signal MCRS to transmission means 3, which transmission means 3 provide for transmission to communication station 1. Instead of amplitude modulation, however, phase modulation or frequency modulation may also be performed.

The data carrier 1 and the circuit 2 of data carrier 1 comprise a microcomputer 15. Instead of microcomputer 15, however, a hard-wired logic circuit may also be provided. Interacting with microcomputer 15 are the storage means 16, which comprise a RAM, a ROM and an EEPROM, as has indeed been known for a long time. The microcomputer 15 can read out the EAS bit configuration EASB1 or EASB2 stored in storage means 16 in each case in response to receiving the request signal IS, so that microcomputer 15 forms readout means for reading out one stored item of EAS bit configuration, EASB1 or EASB2, at a time, which EAS bit configurations EASB1 and EASB2 form status information of significance for data carrier 1 and for the article to which data carrier 1 is attached. Furthermore, the microcomputer 15 serves to realize data processing means 17. The data processing means 17 serve for processing a received request signal IS and further serve for generating a response signal RS upon receiving a request signal IS, i.e. in response to a received request signal IS, such that in forming the response signal RS, the EAS bit configuration read out in each case, EASB1 or EASB2, is taken into account in that it is embedded in the response signal RS. The data processing means 17, together with a plurality of other means which are not shown, thereby also form generating means 17 for generating a response signal RS in response to a received request signal IS. The response signal RS is generated here taking account of or utilizing that EAS bit configuration stored in storage means 16 and read out from storage means 16 which is characteristic of data carrier 1 in each case.

It should be mentioned that the EAS bit configuration read out in each case, EASB1 or EASB2, does not necessarily have to be embedded in response signal RS, but instead, following the reading-out of the first EAS bit configuration EASB1, a special response signal corresponding to the first EAS bit configuration EASB1 may be generated with a pre-specified, fixed first bit pattern, and, following the reading-out of the second EAS bit configuration EASB2, a special response signal corresponding to the second EAS bit configuration EASB2 may be generated with a pre-specified, fixed second bit pattern. In the case of a response signal RS in which the EAS bit configuration read out in each case, EASB1 or EASB2, is embedded, part of the storage contents of storage means 16 may also be incorporated, for example at least part of the identification number of significance for data carrier 1, or other data representing, for example, a destination for a postal consignment.

Data carrier 1 and circuit 2 further comprise processing means 18 for processing response signal RS. Processing means 18 process response signal RS so as to create a transmission signal suitable for transmission to communication station 1, namely the modulated, coded response signal MCRS. A transmission parameter for the transmission signal can be altered here in processing means 18. In the present case, processing means 18 are designed for processing response signal RS in a total of two time windows TW1 and TW2, starting at two different occurrence points, as represented symbolically in FIG. 1. For defining the two time windows TW1 and TW2, starting at two different occurrence points, processing means 18 are equipped with time-window defining means 19 which are realized in the present case by the microcomputer 15. Response signal RS, generated by data processing means 17, can be fed to time-window defining means 19, and the time-window defining means 19 then define a specific time window TW1 or TW2, in which time window, TW1 or TW2, the response signal RS is passed to coding stage 12. It should also be mentioned that processing means 18 comprise time-window defining means 19 and coding stage 12 and modulation stage 13 and the subcarrier signal generator 14.

In data carrier 1 and integrated circuit 2, a first analog/digital converter 20 and a second analog/digital converter 21 are provided. The first analog/digital converter 20 is connected on the input side to the output of power supply circuit 7, so that, the first analog/digital converter 20 can generate a first digital value DV representative of the DC supply voltage V occurring at this output. A voltage VIL proportional to the limiting current IL occurring in limiting stage 8 can be fed to the second analog/digital converter 21, so that the second analog/digital converter 21 can generate a second digital value DVIL representative of this voltage VIL and consequently of the limiting current IL. The first digital value DV and the second digital value DVIL can be fed to microcomputer 15 in order to be processed in microprocessor 15, which, however, will not be described in greater detail here.

The microcomputer 15 serves to realize recognition means 22, to which the EAS bit configuration EASB1 or EASB2 read out from storage means 16 in each case can be fed and which are designed for recognition of the EAS bit configuration read out in each case, EASB1 or EASB2. Depending on the recognized EAS bit configuration, EASB1 or EASB2, recognition means 22 are designed for generating and supplying two representative values REP1 and REP2.

Control connection means 25 are advantageously provided in data carrier 1 and integrated circuit 2 between recognition means 22 and processing means 18. A controlling effect on processing means 18 can be exerted as a function of the EAS bit configuration recognized and read out in each case, EASB1 or EASB2, via control connection means 25. The controlling effect on processing means 18 is here provided for altering the at least one transmission parameter for the transmission signal as a function of the EAS bit configuration recognized and read out in each case, EASB1 or EASB2. In the present case, the alterable transmission parameter is formed by the occurrence time of time window TW. This means that, in the present case, the two occurrence times for the total of two time windows TW can be defined as a function of the EAS bit configuration recognized and read out in each case, EASB1 or EASB2.

In data carrier 1 and circuit 2, control means 26 are provided in control connection means 25, which control means cooperate with recognition means 22, to which the two representative values REP1 and REP2 can be fed, which are designed for generating control data CDA as a function of the two representative values REP1 and REP2, and which cooperate with processing means 18, specifically to alter the, in this case, one transmission parameter with the aid of the generated control data CDA.

The control means 26 can generate control data CDA—as already mentioned—utilizing the two representative values REP1 and REP2, which control data can be fed from control means 26 via a connection 29 to time-window defining means 19. The occurrence time of a time window TW1 or TW2 can be defined by means of control data CDA, in which time window TW1 or TW2 the response signal RS generated by data processing means 17 is passed on to coding stage 12, and consequently the modulated, coded response signal MCRS is transmitted from data carrier 1 to communication station 1.

The data carrier 1 and circuit 2 are designed such that, when the first EAS bit configuration EASB1 is read out from storage means 16 by time-window defining means 19, which are influenced via control connection means 25 as a function of the first EAS bit configuration EASB1 recognized by recognition means 22, the first time window TW1 is defined, so that a transmission of the first EAS bit configuration EASB1 in the form of response signal RS, and consequently of the modulated, coded response signal MCRS, to communication station 40 takes place only during the first time window TW1. If, on the other hand, the second EAS bit configuration EASB2 is read out from storage means 16, this has the consequence for data carrier 1 and circuit 2 that a transmission takes place only during the second time window TW2. In this manner it is achieved by simple means that data carriers 1 in whose storage means 16 different EAS bit configurations are stored, always transmit their EAS bit configuration or their response signal to communication station 40 in different time windows, so that an easy, faultless differentiation between data carriers with differently stored EAS bit configurations is always ensured.

In data carrier 1 and circuit 32 of FIG. 1, only two EAS bit configurations, EASB1 and EASB2, have been mentioned above. In data carrier 1, however, further EAS bit configurations may also be stored in storage means 16, for example, a further EAS bit configuration EASB3 which is stored in storage means 16 of data carrier 1 if data carrier 1 and the article to which data carrier 1 is attached are not allowed to leave the stock-room for the article. A number of further items of status information, i.e. of EAS bit configurations, are also conceivable, with which specific conditions for the transportation and handling of articles can be defined.

Figure 2:
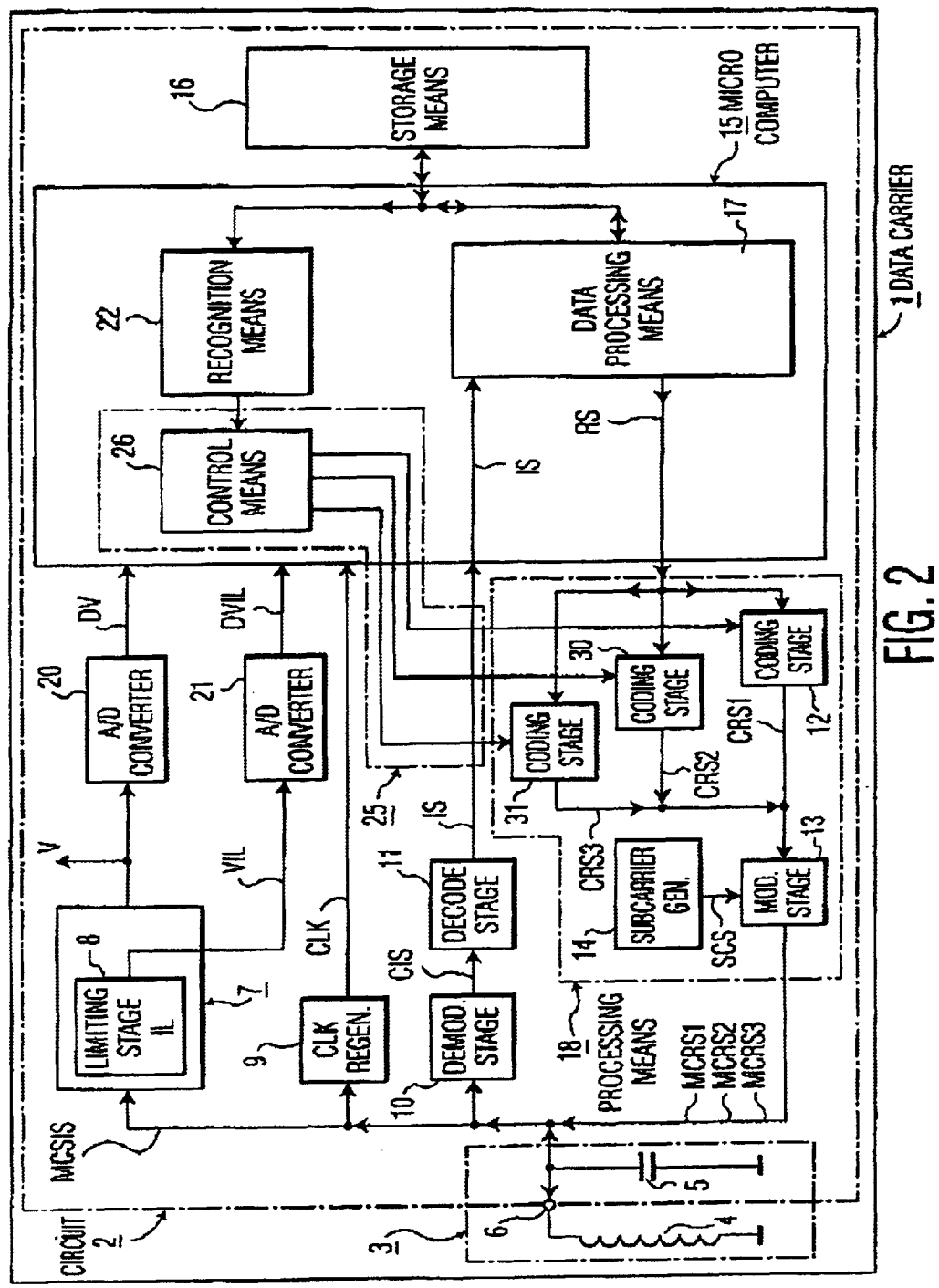
FIG. 2 shows in a manner analogous with FIG. 1 a part of a data carrier and of a circuit for this data carrier that is significant in the present context, according to a second embodiment of the invention.

Data carrier 1 and circuit 2 of FIG. 2 are of the same design as data carrier 1 and circuit 2 of FIG. 1 to a considerable extent. However, in data carrier 1 according to FIG. 2, a different design is chosen for processing means 18.

In data carrier 1 and circuit 2 of FIG. 2, processing means 18 are provided with a second coding stage 30 and a third coding stage 31 in addition to the first coding stage 12. Three different types of coding can be undertaken with the three coding stages 12, 30 and 31. Processing means 18 are in this case designed for processing response signal RS with three different coding types. However, just two or even four or more coding stages may alternatively be provided. The coding types that can be implemented by the three coding stages 12, 30 and 31 differ in that, in each coding type, a different assignment of specific successive signal sequences to a specific logic bit (one or zero) takes place. The fact that specific successive signal sequences are assigned to a specific logic bit has been known for a long time per se as a "spread spectrum" transmission mode.

The three coding stages 12, 30 and 31 can be controlled via the control connection means 25, specifically as a function of the two representative values REP1 and REP2, which can be determined by recognition means 22, and thus as a function of the status information recognized and read out in each case. In this case, a coding stage 12 or 30 or 31 can be activated by the aid of control means 26 as a function of the two representative values REP1 and REP2, and consequently of the status information recognized and read out in each case, so that one coding type can be implemented in each case. The coding stage 12 or 30 or 31 activated in each case supplies the coded response signal CRS1 or CRS2 or CRS3 generated by it to modulation stage 13. Subsequently, modulation stage 13 supplies the response signal MCRS1 or MCRS2 or MCRS3, modulated and coded in each case, to transmission means 3 for transmission to a communication station.

The data carrier 1 and circuit 2 of FIG. 2 thus enable that the coding stage 12 or 30 or 31 activated in each case to be activated as a function of the two representative values REP1 and REP2, so that the coding stage 12 or 30 or 31 activated in each case, and consequently the coding type implemented in each case, is dependent on the status information recognized and read out in each case. It is thereby achieved that data carriers 1 containing different items of status information and having different coding types can transmit their response signal to a communication station and consequently can be easily distinguished from one another by the communication station by virtue of the different coding types.

Regarding the above-mentioned status information, it should also be mentioned that status information of this kind of significance for a data carrier 1 may be status information characteristic of different physical variables and also of other parameters. For example, status information of this kind may be characteristic of temperature ranges to which a data carrier has been subjected. For example, a data carrier may be equipped with temperature sensor means which, for example, can determine three temperature ranges and which comprise storage means in which, depending on the temperature range determined, a significant item of status information is stored. These three temperature ranges may be temperature ranges between $-20°$ C. and $-10°$ C., between $-10°$ C. and $0°$ C., and between $0°$ C. and $+10°$ C. Status information of this kind may also be characteristic of several pressure ranges, for example of air pressure ranges in vehicle tires, if a data carrier is accommodated in a vehicle tire and equipped with a pressure sensor for determining the air pressure in a vehicle tire, which pressure sensor comprises storage means in which an air pressure value can be stored as status information, which air pressure has prevailed in a vehicle tire at a specific operating time. Status information may also represent a measure of vibration to which a data carrier or a product to which a data carrier is attached has been subjected, for example during transportation of a product. Furthermore, status information of this kind may represent destination addresses for items of luggage or postal codes on postal consignments, in which case a very high number of different items of status information will be available for selection, one of which may be stored in a data carrier at a time.

Figure 3:
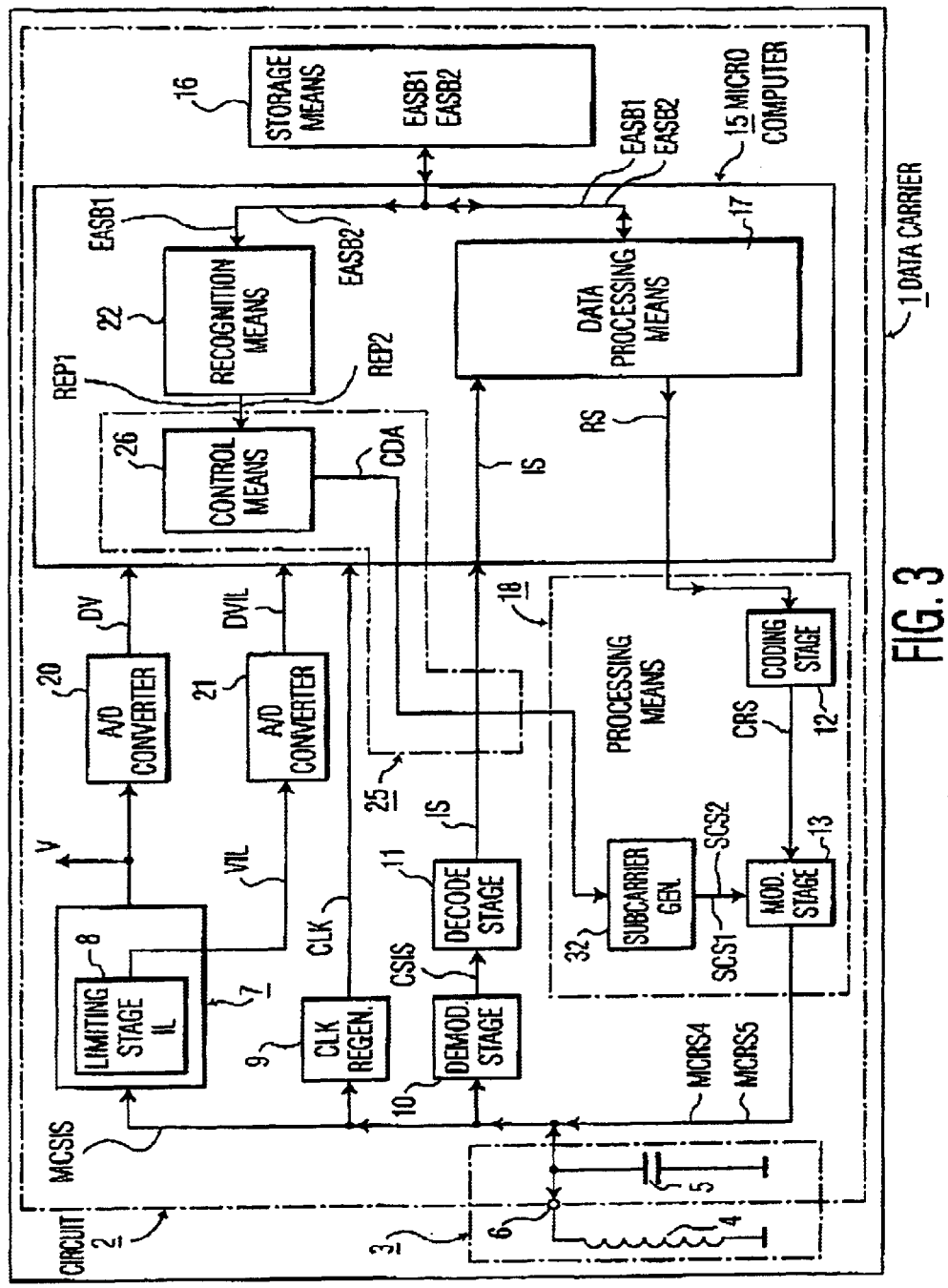
FIG. 3 shows in a manner analogous with FIG. 1 and FIG. 2 a part of a data carrier and of a circuit for this data carrier that is significant in the present context, according to a third embodiment of the invention.

A further design modification for processing means 18 is provided in data carrier 1 and circuit 2 of FIG. 3. In this case, processing means 18 are designed for processing response signal RS with two different subcarrier signals SCS1 and SCS2. Processing means 18 may alternatively be designed for processing response signal RS with more than two different subcarrier signals SCS1 and SCS2, for example with three or four or even many more subcarrier signals. Response signal RS can be modulated by means of the two subcarrier signals SCS1 and SCS2. The two different subcarrier signals SCS1 and SCS2 differ from each other in their frequency, i.e. in the subcarrier frequency. To generate the two subcarrier signals SCS1 and SCS2, subcarrier-signal generating means 32 are provided which are formed by a subcarrier-signal generator with a switchable frequency, to which generator control data CDA can be fed from control means 26, such that the frequency of the subcarrier-signal generator can be switched over as a function of the fed-in control data CDA. The control data CDA is generated in a manner analogous to that of data carrier 1 of FIG. 1 as a function of the two representative values REP1 and REP2, and consequently as a function of the status information recognized and read out in each case, i.e. the EAS bit configuration EASB1 or EASB2 recognized and read out in each case. The two subcarrier signals SCS1 and SCS2, which differ in frequency, can thus be generated by subcarrier-signal generating means 32 as a function of the status information recognized and read out in each case.

The data carrier 1 and circuit 2 of FIG. 3 thus achieve that, in the case of different EAS bit configurations EASB1 and EASB2 read out, different modulation results are supplied by modulation stage 13, which has the result that transmission signals MCRS4 and MCRS5, modulated in different manners, can be transmitted from data carrier 1 to a communication station, so that data carriers in which different status information is stored and which consequently respond with differently modulated transmission signals, can be distinguished in a faultless manner.

Figure 4:
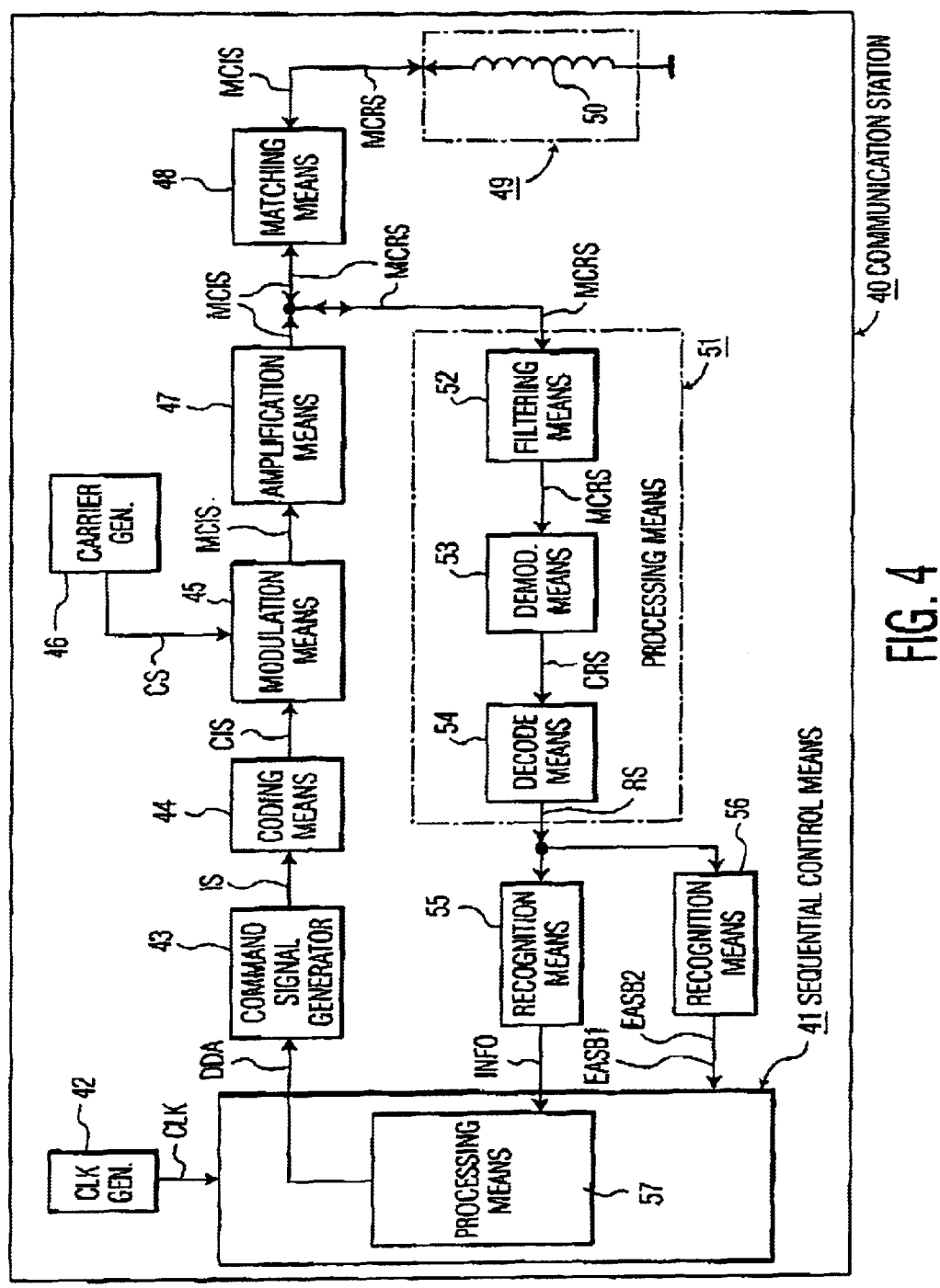
FIG. 4 shows in schematic manner in the form of a block diagram a part of a communication station that is significant in the present context, according to an embodiment of the invention.

FIG. 4 shows the communication station 40 mentioned above. Communication station 40 is provided and designed for contactless communication with a data carrier 1 according to FIG. 1. This means that communication station 40 is designed for contactless communication with data carriers of the kind in which a transmission of a transmission signal to communication station 40 takes place in different time windows.

Communication station 40 contains sequential control means 41, which are realized in the present case by means of a microcomputer. Sequential control means 41 may alternatively be formed by a hard-wired logic circuit. Attached to sequential control means 41 is a clock signal generator 42, which supplies a clock signal CLK to sequential control means 41.

Attached to sequential control means 41 are command-signal generating means 43. A plurality of command signals can be generated by command-signal generating means 43, for example a request signal, a selection signal, a read-command signal, a write-command signal, and a number of other command signals. Representative of all command signals is the request signal IS shown in FIG. 4.

Downstream of command-signal generating means 43 are coding means 44, which can subject a fed-in command signal to a coding. On completion of the coding, coding means 44 emit a coded command signal, for example a coded request signal CIS. Downstream of coding means 44 are modulation means 45, to which a coded command signal, for example a coded request signal CIS, can be fed, and to which additionally a carrier signal CS generated by a carrier-signal generator 46 can be fed. The modulation means 45 can modulate the fed-in carrier signal CS as a function of the likewise fed-in coded command signal, so that the modulation means 45 can, on completion of modulation, emit a modulated, coded command signal, for example a modulated, coded request signal MCIS. Downstream of modulation means 45 are amplification means 47, by which a modulated, coded command signal can be amplified. Downstream of amplification means 47 are matching means 48, downstream of which transmission means 49 are located, which comprise a transmission coil 50 and which are operative both as sending means and as receiving means. A modulated, coded command signal amplified by amplification means 47 is fed via the matching means 48 to the transmission means 49 for transmission to all data carriers 1 according to FIG. 1 present in a communication range of communication station 40.

The circuit components described so far serve for the transmission of signals from communication station 40 to data carrier 1 according to FIG. 1. In communication station 40, means are also provided which are active during transmission of a transmission signal from a data carrier 1 according to FIG. 1 to communication station 40. Among these means are also transmission means 49 and matching means 48.

Also among these means are processing means 51, capable of processing a transmission signal transmitted from a data carrier 1 according to FIG. 1 to communication station 40, for example a modulated, coded response signal MCRS. Processing means 51 comprise filtering means 52, attached to matching means 48, and, downstream of filtering means 52, demodulating means 53 and, downstream of demodulating means 53, decoding means 54. After the respective transmission signal has been filtered by filtering means 52, demodulation takes place with the aid of demodulating means 53 and subsequently decoding takes place with the aid of decoding means 54, so that, in the case of a modulated, coded response signal MCRS transmitted to communication station 40, a coded response signal CRS occurs after the demodulating means 53, and the response signal RS occurs after the decoding means 54.

Downstream of processing means 51 are transmission-parameter recognition means 55 and transmission-signal recognition means 56. In the present case, the transmission-parameter recognition means 55 are time-window recognition means which can recognize in which time window TW1 or TW2 of the two possible time windows TW1 and TW2, each starting at different times, the transmission of a transmission signal transmitted to communication station 40, for example a response signal RS, has taken place.

The transmission-signal recognition means 56 are provided and designed for recognizing the contents of a transmission signal. For example, the contents of a response signal RS can be recognized by the transmission-signal recognition means 56. These contents may be, for example, the serial number of a data carrier 1 and, additionally, data stored in data carrier 1, which represents, for example, a product type, a product price, a manufacturing date, and similar characteristics. In the present context, however, the significant facts are that the contents of a response signal RS contain an item of status information stored in a data carrier 1, i.e. an EAS bit configuration EASB1 or EASB2. The EAS bit configurations, EASB1 or EASB2, recognized by the transmission-signal recognition means 56 are fed to the sequential control means 41 and are passed on for further processing under the control of the sequential control means 41, and are thus fed to a host computer, for example.

If, in the case of a data carrier, the EAS bit configuration EASB1 or EASB2 read out in each case is not embedded in response signal RS, but rather, as the result of the reading-out of the first EAS bit configuration EASB1, a special response signal corresponding to the first EAS bit configuration EASB1 is generated with a pre-specified, fixed first bit pattern, and, as the result of the reading-out of the second EAS bit configuration EASB2, a special response signal corresponding to the second EAS bit configuration EASB2 is generated with a pre-specified, fixed second bit pattern, then the transmission-signal recognition means 56 supply the pre-specified, fixed first bit pattern or the pre-specified, fixed second bit pattern to the sequential control means 41. In the case of a response signal RS in which the EAS bit configuration read out in each case, EASB1 or EASB2, is embedded, and part of the storage contents of storage means 16 is additionally incorporated, for example at least part of the identification number of significance for data carrier 1, or other data representing, for example, a destination for a postal consignment, then the transmission-signal recognition means 56 supply this data to the sequential control means 41.

The transmission-parameter recognition means 55 are designed to generate information data INFO, which information data INFO in each case represents the transmission parameter that is characteristic of the transmission signal received in each case, which, in the present case, is characteristic of that time window in which a transmission signal was transmitted from a data carrier 1 to the communication station 40. At this point, it should be stated that the particular time window in which a transmission of a transmission signal from the data carrier 1 according to FIG. 1 to communication station 40 was effected depends on the EAS bit configuration, EASB1 or EASB2.

The information data INFO generated by transmission-parameter recognition means 55 can be fed to the sequential control means 41. The sequential control means 41 comprise decision means 57 which are advantageously provided between transmission-parameter recognition means 55 and command-signal generating means 43. The decision means 57 are designed such that they generate decision data DDA as a function of the information data INFO obtained from transmission-parameter recognition means 55, which decision data DDA can be fed to command-signal generating means 43. The command-signal generating means 43 may then use the decision data DDA to generate command signals from the total set of command signals that can be generated by command-signal generating means 43 on the basis of the decision data DDA. This offers the advantage that the command-signal generating means 43 obtain the decision regarding the generation of specific command signals from the decision means 57, where the decision data DDA generated by the decision means 57 is based on information data INFO fed to decision means 57 in each case, i.e. the time window recognized in each case, and consequently on the EAS bit configuration EASB1 or EASB2 transmitted to communication station 40.

In the case of a communication station for contactless communication with a data carrier 1 according to FIG. 2, which communication station is not shown, transmission-parameter recognition means and transmission-signal recognition means are again provided; however, the transmission-parameter recognition means are now designed for recognizing the type of coding, with which a transmission signal has been transmitted from data carrier 1 according to FIG. 2 to the communication station. It is further provided in this case that the transmission-parameter recognition means cooperate with the transmission-signal recognition means, specifically in such a manner that the transmission-parameter recognition means supply to the transmission-signal recognition means an item of control information once recognition has taken place by means of the transmission-parameter recognition means as to which transmission parameter has been transmitted to the communication station with a transmission signal, so that then, utilizing this control information, the transmission-signal recognition means can faultlessly recognize a transmission signal transmitted to the communication station.

In a communication station for contactless communication with a data carrier 1 according to FIG. 3, which communication station is likewise not shown, transmission-parameter recognition means and transmission-signal recognition means are again provided; however, the transmission-parameter recognition means are now designed for recognizing the subcarrier frequency used for the modulated transmission signal, and consequently the modulated, coded transmission signal is fed to the transmission-parameter recognition means, while the transmission-parameter recognition means exert an influence on the demodulation means in the processing means in order to be able to make provision for a faultless demodulation of the modulated, coded transmission signal in accordance with the recognized modulation circumstances.

In the data carriers 1 and circuits 2 described above with reference to FIGS. 1, 2 and 3, the request signals IS are transmitted in an amplitude-modulated, coded manner from a communication station to the data carrier 1 in question and bring about the direct generation of a response signal RS in data carrier 1. Both the request signal IS and the response signal RS are formed here by data words with a pre-specified word length. It is, however, alternatively possible that the request signal is formed by an unmodulated trigger signal generated by the communication station, which trigger signal is essentially a sinusoidal signal without information content and is emitted from the communication station by its transmission means into a communication range of the communication station, where it is received by the transmission means of a data carrier entering the communication range of the communication station, as a result of which the data carrier in question is supplied with power and subsequently the generation of a response signal by the generating means of the data carrier is initiated automatically.

What is claimed is:

1. A data carrier (1) for contactless communication with a communication station (40), which data carrier (1) comprises the means listed below:

receiving means (3) for receiving a request signal (IS), which request signal (IS) can be generated by a communication station (40) and can be transmitted to the data carrier (1) in a contactless manner with the aid of a field generated by the communication station (40) and acting on the data carrier (1), and storage means (16), which storage means (16) are designed for storing at least two items of status information (EASB1, EASB2) of significance for the data carrier (1), and read out means (15) for reading out, in each case, one stored item of status information (EASB1, EASB2) in response to receiving the request signal (IS), and processing means (18) for processing the status information (EASB1, EASB2) read out in each case, which processing means (18) are designed to process the status information (EASB1, EASB2) read out in each case so as to create a transmission signal (MCRS, MCRS1, MCRS2, MCRS3, MCRS4, MCRS5) suitable for transmission to the communication station (40), and in which processing means (18) at least one transmission parameter for the transmission signal (MCRS; MCRS1, MCRS2, MCRS3, MCRS4, MCRS5) can be altered, and recognition means (22) for recognizing the status information (EASB1, EASB2) read out in each case, and control connection means (25) between the recognition means (22) and the processing means (18), which control connection means (25) are designed to have a controlling effect on the processing means (18) as a function of the status information (EASE1, EASB2) recognized and read out in each case, specifically to alter the at least one transmission parameter for the transmission signal (MCRS; MCRS1, MCRS2, MCRS3, MCRS4, MCRS5) as a function of the status information (EASB1, EASB2) recognized and read out in each case.

2. A data carrier (1) as claimed in claim 1, wherein control means (26) are provided in the control connection means (25), which control means (26) cooperate with the recognition means (22), are designed for generating control data (CDA) as a function of the status information (EASB1, EASB2) recognized and read out in each case, and cooperate with the processing means (18), specifically to alter the at least one transmission parameter for the transmission signal (MCRS; MCRS1, MCRS2, MCRS3, MCRS4, MCRS5) on the basis of the generated control data CDA.

3. A data carrier (1) as claimed in claim 1, wherein the processing means (18) are designed for processing the status information (EASB1, EASB2) recognized and read out in each case in at least two time windows (TW1 and TW2) starting at different occurrence times, and wherein the processing means (18) are equipped for this purpose with time-window defining means (19) by which at least two different occurrence times for time windows (TW1, TW2) can be defined as a function of the status information (EASB1, EASB2) recognized and read out in each case.

4. A data carrier (1) as claimed in claim 1, wherein the processing means (18) are designed for processing the status information recognized and read out in each case with at least two different coding types, and whereby the processing means (18) for this purpose comprise at least two coding stages (12, 30, 31) for implementing different coding types, by means of which stages at least two different coding types can be implemented as a function of the status information recognized and read out in each case.

5. A data carrier (1) as claimed in claim 1, wherein the processing means (18) are designed for processing the status information (EASB1, EASB2) recognized and read out in each case with at least two different subcarrier signals (SCS1, SCS2) by means of which the status information (EASB1, EASB2) recognized and read out in each case can be modulated, and wherein the processing means (18) are equipped for this purpose with subcarrier-signal generating means (32), by which at least two different subcarrier signals (SCS1, SCS2) can be created as a function of the status information (EASB1, EASB2) recognized and read out in each case.

6. A data carrier (1) as claimed in claim 1, wherein the storage means (16) are designed for storing two bit configurations (EASB1, EASB2) which can be generated as part of an electronic article surveillance system.

7. A circuit (2) for a data carrier (1) for contactless communication with a communication station (40), which circuit (2) comprises the following means:

connection means (6) for receiving an request signal (IS), which request signal (IS) can be generated by a communication station (40) and can be transmitted in a contactless manner with the aid of a field generated by the communication station (40) and acting upon a data carrier (1) to the data carrier (1) and consequently to the circuit (2) for the data carrier (1), and storage means (16), which storage means (16) are designed for storing at least two items of status information (EASB1, EASB2) of significance to the data carrier (1), and read out means (15) for reading out one stored item of status information (EASB1, EASB2) in each case in response to receiving the request signal (IS), and processing means (18) for processing the status information (EASB1, EASB2) read-out in each case, which processing means (18) are designed for processing the status information (EASB1, EASB2) read-out in each case so as to create a transmission signal (MCRS, MCRS1, MCRS2, MCRS3, MCRS4, MCRS5) suitable for transmission to the communication station (40), and in which processing means (18) at least one transmission parameter for the transmission signal (MCRS, MCRS1, MCRS2, MCRS3, MCRS4, MCRS5) can be altered, and recognition means (22) for recognizing the status information (EASB1, EASB2) read out in each case, and control connection means (25) between the recognition means (22) and the processing means (18), which control connection means (25) are designed to have a controlling effect on the processing means (18) as a function of the status information (EASB1, EASB2) read out in each case, specifically to alter the at least one transmission parameter for the transmission signal (MCRS, MCRS1, MCRS2, MCRS3, MCRS4, MCRS5) as a function of the status information (EASB1, EASB2) recognized and read out in each case.

8. A circuit (2) as claimed in claim 7, wherein control means (26) are provided in the control connection means (25), which control means (26) cooperate with the recognition means (22), are designed for generating control data (CDA) as a function of the status information (EASB1, EASB2) recognized and read out in each case, and cooperate with the processing means (18), specifically to alter the at least one transmission parameter for the transmission signal (MCRS, MCRS1, MCRS2, MCRS3, MCRS4, MCRS5) on the basis of the generated control data (CDA).

9. A circuit (2) as claimed in claim 7, wherein the processing means (18) are designed for processing the status information (EASB1, EASB2) recognized and read out in each case in at least two time windows (TW1, TW2) starting at different occurrence times, and wherein the processing means (18) are equipped for this purpose with time-window defining means (19) by which at least two different occurrence times can be defined for time windows (TW1, TW2) as a function of the status information (EASB1, EASB2) recognized and read out in each case.

10. A circuit (2) as claimed in claim 7, wherein the processing means (18) are designed for processing the status information recognized and read out in each case with at least two different coding types, and wherein the processing means (18) are equipped for this purpose with at least two coding stages (12, 30, 31) designed for implementing different coding types, by means of which stages at least two different coding types can be implemented as a function of the status information recognized and read out in each case.

11. A circuit (2) as claimed in claim 7, wherein the processing means (18) are designed for processing the status information (EASB1, EASB2) recognized and read out in each case with at least two different subcarrier signals (SCS1, SCS2), by means of which the status information (EASB1, EASB2) recognized and read out in each case can be modulated, and wherein the processing means (18) are equipped for this purpose with subcarrier-signal generating means (32) by which at least two different subcarrier signals (SCS1, SCS2) can be generated as a function of the status information (EASB1, EASB2) recognized and read out in each case.

12. A circuit (2) as claimed in claim 7, wherein the storage means (16) are designed for storing two bit configurations (EASB1, EASB2) which can be generated as part of an electronic article surveillance system.

13. A communication station (40) for contactless communication with a data carrier (1), which data carrier (1) is designed for contactless communication with the communication station (40) and comprises the means listed below:

receiving means (3) for receiving an request signal (IS), which request signal (IS) can be generated by a communication station (40) and can be transmitted to the data carrier (1) in a contactless manner with the aid of a field generated by the communication station (40) and acting on the data carrier (1), and storage means (16), which storage means (16) are designed for storing at least two items of status information (EASB1, EASB2) of significance for data carrier (1), and read out means (15) for reading out one stored item of status information (EASB1, EASB2) at a time in response to receiving the request signal (IS), and processing means (18) for processing the status information (EASB1, EASB2) read-out in each case, which processing means (18) are designed for processing the status information (EASB1, EASB2) read out in each case so as to create a transmission signal (MCRS, MCRS1, MCRS2, MCRS3, MCRS4, MCRS5) suitable for transmission to the communication station (40), and in which processing means (18) at least one transmission parameter for the transmission signal (MCRS, MCRS1, MCRS2, MCRS3, MCRS4, MCRS5) can be altered, and recognition means (22) for recognizing the status information (EASB1, EASB2) read out in each case, and control connection means (25) between the recognition means (22) and the processing means (18), which control connection means (25) are designed to have a controlling effect on the processing means (18) as a function of the status information (EASB1, EASB2) recognized and read out in each case, specifically to alter the at least one transmission parameter for the transmission signal (MCRS, MCRS1, MCRS2, MCRS3, MCRS4, MCRS5) as a function of the status information (EASB1, EASB2) recognized and read out in each case, wherein said communication station (40) comprises the means listed below:

command-signal generating means (43) for generating command signals (IS) and receiving means (49) for receiving the transmission signal (MCRS) transmitted from the data carrier (1) to the communication station (40), and processing means (51) for processing the received transmission signal (MCRS) and transmission-parameter recognition means (55) for recognizing the transmission parameter of the received transmission signal (MCRS), and decision means (57) which cooperate with the transmission-parameter recognition means (55) and which are provided and designed for making a decision as to the generation of at least one command signal as a function of the transmission parameter of the received transmission signal (MCRS) recognized by the transmission-parameter recognition means (55).

14. A communication station (40) as claimed in claim 13, wherein the decision means (57) are provided between the transmission-parameter recognition means (55) and the command-signal generating means (43) and are designed to influence the command-signal generating means (43) as a function of the transmission parameter of the received transmission signal (MCRS) recognized by the transmission-parameter recognition means (55), specifically in respect of which command signals are to be generated by the command-signal generating means (43).

* * * * *